(12) United States Patent
Vazquez

(10) Patent No.: US 12,495,123 B1
(45) Date of Patent: Dec. 9, 2025

(54) TELEVISION WRAP

(71) Applicant: Jason Vazquez, Redding, CA (US)

(72) Inventor: Jason Vazquez, Redding, CA (US)

( * ) Notice: Subject to any disclaimer, the term of this patent is extended or adjusted under 35 U.S.C. 154(b) by 84 days.

(21) Appl. No.: 18/389,500

(22) Filed: Nov. 14, 2023

(51) Int. Cl.
*H04N 19/52* (2014.01)
*H04N 5/64* (2006.01)

(52) U.S. Cl.
CPC ..................................... *H04N 5/64* (2013.01)

(58) Field of Classification Search
CPC ....................................................... H04N 5/64
See application file for complete search history.

(56) References Cited

U.S. PATENT DOCUMENTS

| | | | |
|---|---|---|---|
| 6,111,357 A * | 8/2000 | Fleming | H10K 59/131 428/917 |
| 6,373,537 B2 * | 4/2002 | Yun | G06F 1/1616 361/679.21 |
| 6,550,172 B2 | 4/2003 | Korpai | |
| 6,578,972 B1 | 6/2003 | Heirich et al. | |
| 6,962,017 B1 * | 11/2005 | Pounds | G09F 1/12 40/781 |
| 10,972,696 B1 * | 4/2021 | Mischel, Jr. | H04N 5/655 |
| 2004/0100591 A1 | 5/2004 | Griesse | |
| 2004/0154204 A1 * | 8/2004 | Fu | G09F 3/20 40/661.01 |
| 2007/0127194 A1 * | 6/2007 | She | G06F 1/1609 248/917 |
| 2008/0013310 A1 * | 1/2008 | Kang | G02F 1/133608 362/225 |
| 2008/0080209 A1 * | 4/2008 | Shin | G02B 6/009 362/362 |
| 2008/0278657 A1 * | 11/2008 | Stoops | G02F 1/133308 349/60 |
| 2010/0077688 A1 * | 4/2010 | Bowen | G09F 15/0018 52/506.09 |
| 2014/0024418 A1 * | 1/2014 | Hu | H04M 1/026 455/575.8 |
| 2014/0267973 A1 * | 9/2014 | Shinojima | G02F 1/133308 349/58 |

(Continued)

FOREIGN PATENT DOCUMENTS

| | | |
|---|---|---|
| GB | 2409563 A | 6/2005 |
| WO | WO-2015165518 A1 * | 11/2015 ........... F25D 29/005 |

OTHER PUBLICATIONS

Samsung Customisable Bezel for The Frame 55" TV Burgundy. Product Listing [online]. Copyright © 1995-2023 eBay Inc. [retrieved on Apr. 27, 2023]. Retrieved from the Internet: <URL: https://www.ebay.co.uk/p/28031684512?lid=164441031059>.

(Continued)

*Primary Examiner* — Howard D Brown, Jr.
(74) *Attorney, Agent, or Firm* — Cramer Patent & Design, PLLC.; Aaron R. Cramer

(57) ABSTRACT

The television wrap may comprise a wrap and a pair of clamps. The wrap may be operable to cover a left edge, a top edge, and a right edge of a flat-screen television. The wrap may alter the color and/or the decorative appearance of the flat-screen television. The wrap may comprise indicia suggestive of a team, a business, a school, or other entity. The pair of clamps may secure the wrap to the flat-screen television. The wrap may leave operator controls and an IR sensor of the flat-screen television unobstructed and fully functional.

2 Claims, 3 Drawing Sheets

(56) References Cited

U.S. PATENT DOCUMENTS

2016/0052330 A1   2/2016   Cunningham
2020/0154579 A1   5/2020   Dry et al.

OTHER PUBLICATIONS

Samsung unveils new bezels for The Frame TV. Product Listing [online]. Samsung [published on Nov. 13, 2019; retrieved on Apr. 27, 2023]. Retrieved from the Internet: <URL: https://news.samsung.com/uk/samsung-unveils-new-bezels-for-the-frame-tv>.

Samsung Customizable Bezel for Samsung The Frame 32" (White). Product Listing [online]. © 2023 Walmart. [published on Nov. 13, 2019; retrieved on Apr. 27, 2023]. Retrieved from the Internet: <URL: https://www.walmart.com/ip/Samsung-VG-SCFT32WT-32-White-Customizable-Bezel-For-the-Frame-TV-2020/937255969?from=searchResults>.

\* cited by examiner

TELEVISION WRAP

RELATED APPLICATIONS

None.

FIELD OF THE DEVICE

The present device relates generally to accessories for electronic displays, and more particularly to decorative and protective coverings for flat-screen televisions. The device encompasses a wrap that is adaptable to flat-screen televisions of various sizes for the purpose of altering their aesthetic appearance, providing a degree of protection, and allowing for personalization or branding without interfering with the functionality of the television's display or control features.

BACKGROUND OF THE DEVICE

Flat-screen televisions have become ubiquitous in modern households, offices, and public venues. They are often designed with a minimalist aesthetic, featuring slim profiles and narrow bezels. While this design suits a wide range of interior decors, it offers little in the way of personalization, branding, or aesthetic differentiation. Additionally, the static physical appearance of these televisions does not lend itself to temporary thematic changes, such as those desired during sports events, corporate branding, or other occasions.

Previous attempts to personalize or alter the appearance of televisions typically involve applying stickers, decals, or other adhesive materials directly to the surfaces of the televisions. These methods can leave residue, potentially damage the television when removed, and do not offer protection to the edges of the television. Furthermore, they often obstruct the television's IR sensor or control buttons, impairing functionality.

Therefore, there is a need for a solution that allows users to customize the appearance of their flat-screen televisions easily and reversibly, without damaging the television or hindering its use. Such a solution should accommodate the various locations of IR sensors and control buttons found on different television models while also being easy to install and remove. The present device addresses these needs by providing a wrap that can be securely attached to and removed from a flat-screen television without the use of adhesives, offering an alternative to the more permanent and potentially damaging methods currently available.

SUMMARY OF THE DEVICE

Embodiments of the present disclosure include a television wrap for a flat-screen television, which features a U-shaped wrap configured to cover the left edge, top edge, and right edge of the flat-screen television. The wrap includes a left edge cover, a top edge cover, and a right edge cover.

Each edge cover has a front portion positioned in front of the flat-screen television and a rear portion positioned behind the flat-screen television, with an interconnecting portion coupling the front and rear portions. There is a gap defined between the front and rear portions designed to receive the respective edge of the flat-screen television. Indicia representative of entities such as a team, business, or school may be disposed on the wrap. Additionally, the wrap includes a pair of clamps to secure it to the television, with each clamp comprising a first and a second clamp armature.

The second clamp armature is pivotably coupled to the first, and a jaw is positioned at one end of each clamp armature. A handle, positioned at the opposing end of each clamp armature, is configured to pivot the jaws apart against the biasing force of a spring, enabling the wrap to be installed or removed from the television.

In certain embodiments, the edge covers are U-shaped channels made of a semi-rigid material such as plastic, natural rubber, synthetic rubber, silicone, or a combination thereof. The front portion is designed to cover the bezel of the television without obstructing the display screen. The wrap is configured to leave the bottom edge of the television uncovered to avoid interference with operator controls and an IR sensor.

The indicia on the wrap can include text, graphics, or a combination thereof, featuring elements like a team or corporate logo, a school mascot, a tag line, or a team name. The method of using the television wrap involves aligning the gap in the edge covers with the corresponding edges of the flat-screen television, actuating the handles of the clamps to separate the jaws, lowering the wrap onto the television until the top edge is received within the gap of the top edge cover, and then releasing the handles to engage the jaws with the television, thereby securing the wrap in place.

The wrap may be colored to represent team colors, corporate colors, or school colors. In some embodiments, the edge covers are hollow to reduce the overall weight of the wrap.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

DESCRIPTIVE KEY

Figure 1:
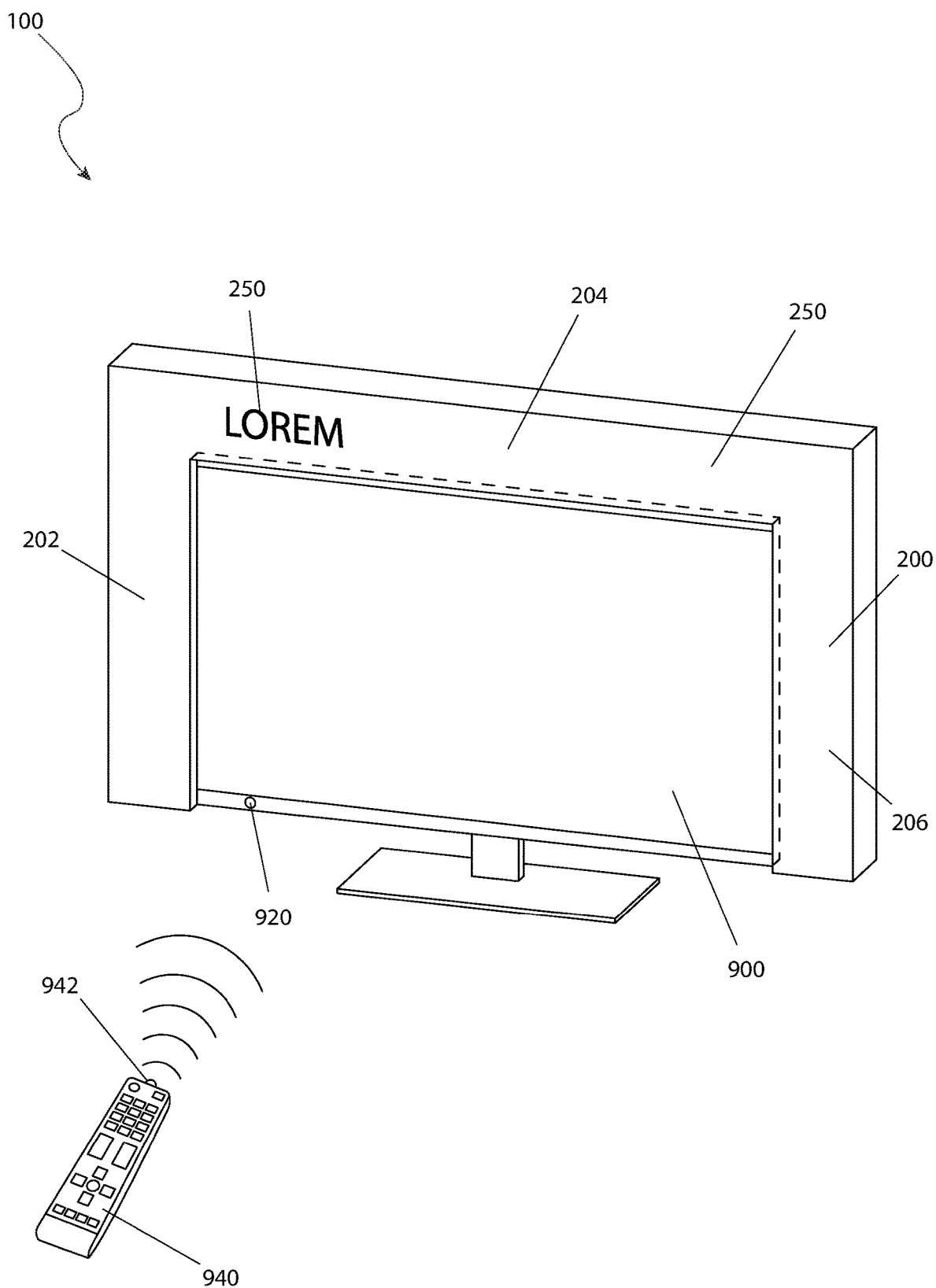
FIG. 1 is an isometric in-use view of a television wrap 100, according to an embodiment of the present device.
Figure 2:
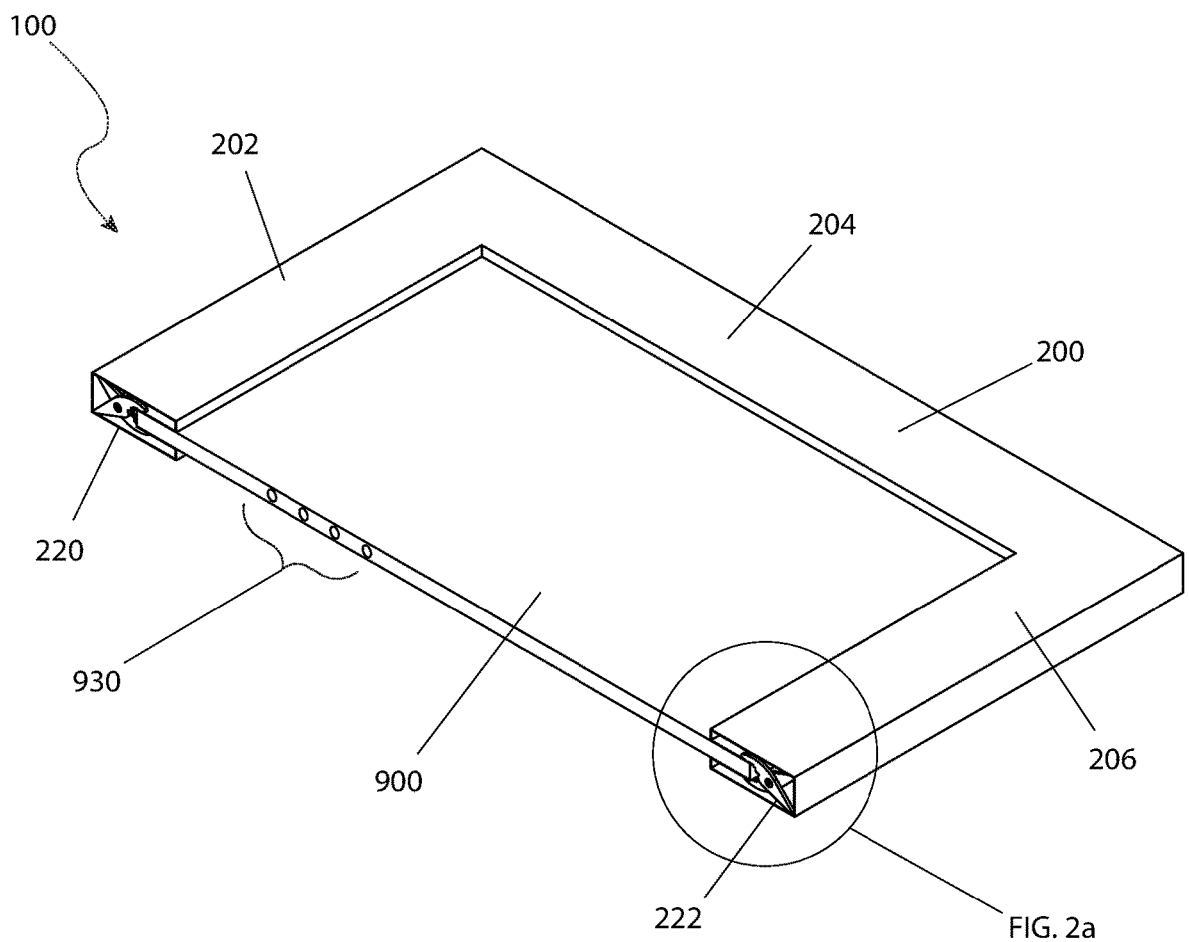
FIG. 2 is a detail view of a television wrap 100, according to an embodiment of the present device, illustrating locations of the left clamp 220 and the right clamp 222.
Figure 2A:
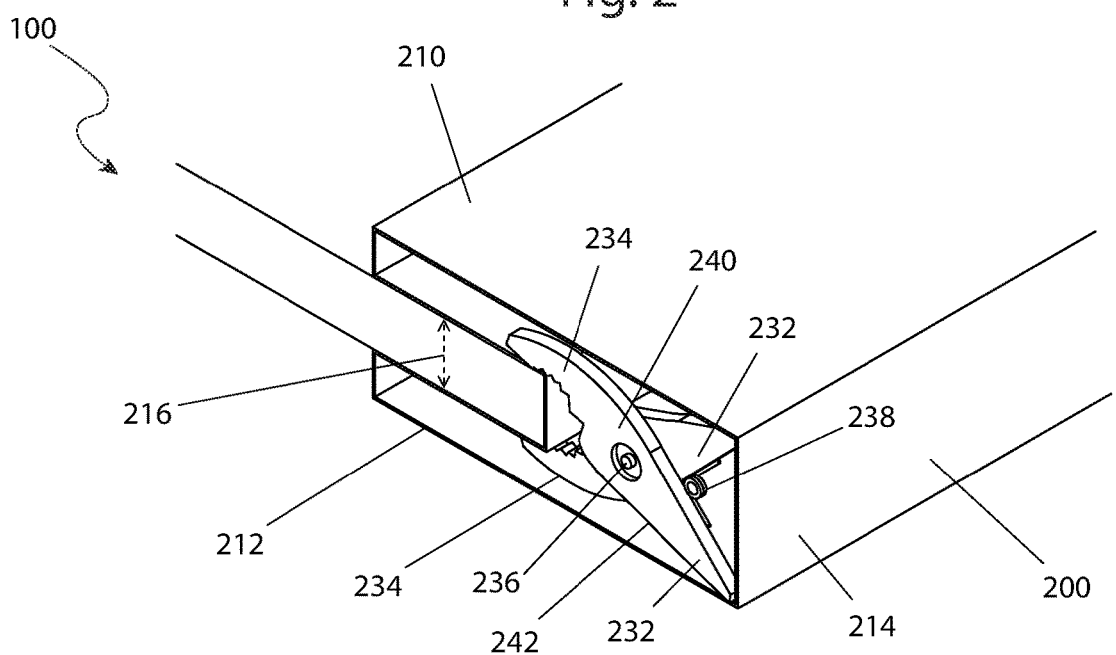
FIG. 2a is a detail view of a television wrap 100, according to an embodiment of the present device, illustrating the right clamp 222.
Figure 3:
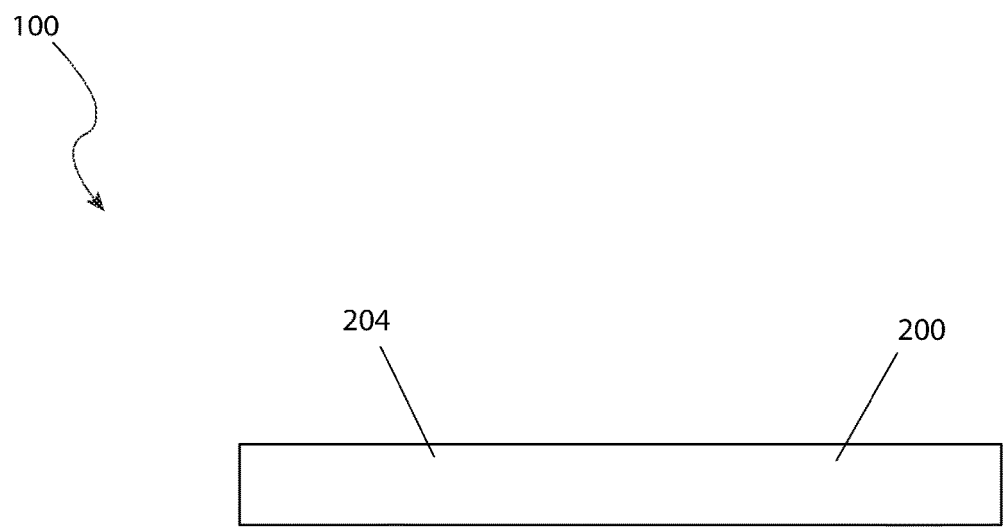
FIG. 3 is a top view of a television wrap 100, according to an embodiment of the present device; and, FIG. 4 is a rear view of a television wrap 100, according to an embodiment of the present device.
Figure 4:
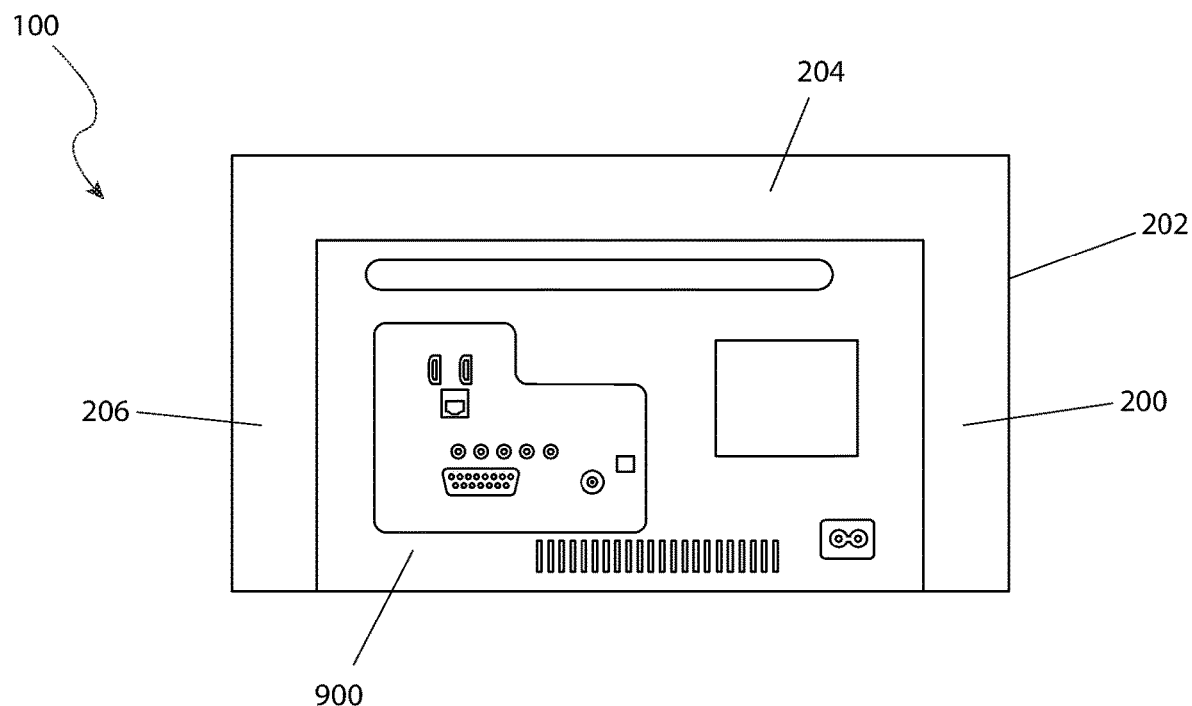

100 television wrap
200 wrap
202 left edge cover
204 top edge cover
206 right edge cover
210 front portion
212 rear portion
214 interconnecting portion
216 gap
220 left clamp
222 right clamp
232 handle
234 jaw
236 clamp pivot
238 spring
240 first clamp armature 242 second clamp armature
250 indicia
900 flat-screen television
920 IR sensor
930 operator controls
940 remote control
942 IR transmitter 1. Description of the Device The present device is directed to a television wrap (herein described as the "device") 100. The device 100 may comprise a wrap 200 and a pair of clamps. The wrap 200 may be operable to cover a left edge, a top edge, and a right edge of a flat-screen television 900. The wrap 200 may alter the color and/or the decorative appearance of the flat-screen television 900. The wrap 200 may comprise indicia 250 suggestive of a team, a business, a school, or other entity. The pair of clamps may secure the wrap 200 to the flat-screen television 900. The wrap 200 may leave operator controls 930 and an IR sensor 920 of the flat-screen television 900 unobstructed and fully functional.

The wrap 200 may be a U-shaped cover for the flat-screen television 900. The wrap 200 may comprise a left edge cover 202, a top edge cover 204, and a right edge cover 206 which may cover the left edge, the top edge, and the right edge of the flat-screen television 900. As a non-limiting example, the left edge cover 202 and the right edge cover 206 may slide down onto the left edge and the right edge of the flat-screen television 900 respectively, until the top edge cover 204 reaches and covers the top edge of the flat-screen television 900.

An individual edge cover selected from the left edge cover 202, the top edge cover 204, and the right edge cover 206 may be a U-shaped channel. The individual edge cover may be hollow. The individual edge cover may be made of a semi-rigid material. As non-limiting examples, the individual edge cover may be made of plastic, natural or synthetic rubber, silicone, of any combination thereof.

The individual edge cover may comprise a front portion 210 that may be positioned in front of the flat-screen television 900, a rear portion 212 that may be positioned behind the flat-screen television 900, and an interconnecting portion 214 that may couple the front portion 210 to the rear portion 212. The front portion 210 may cover a bezel of the flat-screen television 900 but may stop short of covering any portion of the display screen. The individual edge cover may define a gap 216 between the front portion 210 and the rear portion 212 such that the individual edge cover may be positioned with the flat-screen television 900 in the gap 216.

The wrap 200 may leave a bottom edge of the flat-screen television 900 uncovered such that the wrap 200 may avoid interference with the operator controls 930 that may be located on the bottom surface of the flat-screen television 900. Leaving the bottom edge uncovered may also avoid interference with communication between an IR transmitter 942 in a remote control 940 and the IR sensor 920 located on the bottom front of the flat-screen television 900.

The pair of clamps may be located at the bottom corners of the wrap 200. The pair of clamps may grasp the bottom corners of the flat-screen television 900 to retain the wrap 200 on the flat-screen television 900. Specifically, a left clamp 220 located within the bottom of the left edge cover 202 may grasp the bottom left corner of the flat-screen television 900 and a right clamp 222 located within the bottom of the right edge cover 206 may grasp the bottom right corner of the flat-screen television 900.

An individual clamp may comprise a pair of clamp armatures and a spring 238. An individual clamp armature selected from the pair of clamp armatures may comprise a jaw 234 and a handle 232 located at opposing ends of the individual clamp armature. The pair of clamp armatures may be pivotably coupled at a clamp pivot 236 such that the jaw 234 of a first clamp armature 240 is positioned adjacent to the jaw 234 of a second clamp armature 242. The spring 238 may be coupled to the handles 232 such that the spring 238 biases the handles 232 to separate, thus pushing the jaws 234 together. The individual clamp may be opened by squeezing the handles 232 together in order to pivot the jaws 234 apart.

The pair of clamps may be coupled to the wrap 200 with the jaws 234 adjacent to the flat-screen television 900 and the handles 232 oriented away from the flat-screen television 900. In some embodiments, the handles 232 bay me coupled to the wrap 200 such that squeezing the wrap 200 at the location of the handle 232 may open the jaws 234 to permit movement of the wrap 200. As a non-limiting example, the pair of clamps may be held open while installing the wrap 200 so that the left edge cover 202 and the right edge cover 206 may slide over the flat-screen television 900 unobstructed by the jaws 234 of the pair of clamps.

As non-limiting examples, the coloring of the wrap 200 may be suggestive of team colors, corporate colors, or school colors. The wrap 200 may bear the indicia 250. The indicia 250 may be textual, graphical, or a combination of both. As non-limiting examples, the indicia 250 may comprise a team or corporate logo, a school mascot, a tag line, a team name, or any combination thereof.

In use, the wrap 200 may be placed on a flat-screen television 900 by positioning the wrap 200 above the flat-screen television 900 with the gap 216 in the left edge cover 202 aligned with the left edge of the flat-screen television 900 and with the gap 216 in the right edge cover 206 aligned with the right edge of the flat-screen television 900. With the pair of clamps squeezed to separate the jaws 234, the wrap 200 may be lowered until the top edge of the flat-screen television 900 slides into the gap 216 on the top edge cover 204. The pair of clamps may be released in order to grasp the flat-screen television 900.

The exact specifications, materials used, and method of use of the device 100 may vary upon manufacturing. The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A decorative television wrap for a flat-screen television, comprising:
   a left edge cover, a top edge cover, and a right edge cover collectively forming a wrap configured to cover a left edge, a top edge, and a right edge of the flat-screen television, wherein:
      each of the left edge cover, top edge cover, and right edge cover comprises:
         a front portion configured to extend over a bezel of the flat-screen television without obstructing a display screen of the flat-screen television;
         a rear portion configured to extend behind the flat-screen television;

an interconnecting portion coupling the front portion to the rear portion; and,
  a gap defined between the front portion and the rear portion, the gap dimensioned to receive the corresponding edge of the flat-screen television;
wherein the left edge cover and the right edge cover are each hollow and made of a semi-rigid material selected from the group consisting of plastic, natural rubber, synthetic rubber, silicone, or any combination thereof;
a left clamp coupled within the left edge cover and configured to grasp a bottom left corner of the flat-screen television, the left clamp comprising:
  a pair of clamp armatures pivotably coupled at a clamp pivot;
  a jaw positioned at one end of each clamp armature;
  a handle positioned at an opposing end of each clamp armature; and,
  a spring coupled to the handles and biasing the jaws toward a closed position, such that squeezing the handles pivots the jaws apart to permit installation or removal of the wrap from the flat-screen television; and,
a right clamp coupled within the right edge cover and configured to grasp a bottom right corner of the flat-screen television, the right clamp comprising the same structure as the left clamp; and,
wherein the wrap is configured to leave a bottom edge of the flat-screen television uncovered to avoid interference with operator controls and an IR sensor located on the bottom of the flat-screen television; and,
wherein the wrap comprises visible indicia suggestive of a team, a business, a school, or other entity.

2. The decorative television wrap of claim 1, wherein the indicia comprise at least one of textual content, graphical content, or a combination thereof, including at least one of a team logo, corporate logo, school mascot, tag line, or team name.

* * * * *